United States Patent [19]

Jäger et al.

[11] 4,140,934
[45] Feb. 20, 1979

[54] POWER TERMINAL STRUCTURE FOR STATOR COMPONENT OF HIGH-OUTPUT TURBO-GENERATOR

[75] Inventors: Kurt Jäger; Eugen Kunz; Josko Vlah, all of Mannheim, Fed. Rep. of Germany

[73] Assignee: BBC Brown Boveri & Company Limited, Baden, Switzerland

[21] Appl. No.: 751,746

[22] Filed: Dec. 17, 1976

[30] Foreign Application Priority Data

Dec. 19, 1975 [DE] Fed. Rep. of Germany ....... 2557299

[51] Int. Cl.² .......................................... H02K 11/00
[52] U.S. Cl. ...................................... 310/71; 310/54; 310/89; 322/25; 336/105
[58] Field of Search ........................ 310/71, 64, 52, 53, 310/55, 58, 54, 180, 179, 184, 194, 89, 91, 258, 66, 42, 198, 176; 322/25, 32; 336/105, 174; 174/DIG. 10

[56] References Cited

U.S. PATENT DOCUMENTS

| | | | |
|---|---|---|---|
| 3,045,171 | 7/1962 | Heins | 322/25 |
| 3,808,489 | 4/1974 | Albright | 310/52 |
| 3,899,731 | 8/1975 | Smith | 322/25 |
| 3,903,441 | 9/1975 | Towne | 310/71 |
| 4,029,978 | 6/1977 | Jäger | 310/71 |

Primary Examiner—R. Skudy
Attorney, Agent, or Firm—Burns, Doane, Swecker & Mathis

[57] ABSTRACT

A stator conductor terminal assembly is located at the underside of the housing of a three-phase turbo-generator for leading out the phase windings from the stator coil head. The assembly includes three fully insulated liquid-cooled tubular lead-off conductors connected respectively to the phase windings and each such conductor includes a first section directed vertically downward, a second section directed horizontally for different distances and a third section also directed vertically downward and which is shielded in a metallic box-like enclosure. A current transformer surrounds the third section of the conductor within the box-like enclosure and the lower end of the third section which passes through the open bottom of the enclosure is connected to a terminal which latter is connected to an outgoing phase line. Metallic tubular shielding surrounds each phase line and this shielding is connected by way of electrically conductive bellows to the box-like enclosure. The three box-like enclosures are mounted side-by-side by means of bolted-together flanges and interfacing side walls of the enclosures are open to permit circulation of an air coolant therebetween and include arc barriers to prevent multi-phase short-circuits.

7 Claims, 4 Drawing Figures

POWER TERMINAL STRUCTURE FOR STATOR COMPONENT OF HIGH-OUTPUT TURBO-GENERATOR

BACKGROUND OF THE INVENTION

This invention relates to an improved arrangement for the stator power terminals for a high-output turbo-generator, its housing being filled with a non-combustible and non-oxidizing gas at a pressure which exceeds atmospheric, and wherein the conductors in the rotor and stator components are cooled by means of a circulating fluid coolant.

More particularly, the present invention relates to an improvement in the general arrangement as disclosed in our co-pending United States application Ser. No. 588,624 filed June 20, 1975, now U.S. Pat. No. 4,029,978. In that application a stator conductor terminal assembly is located in a casing attached to the underside of the housing of a three-phase turbo-generator for leading out the phase winding from the stator coil heads. The assembly includes three liquid-cooled hollow lead-off conductors each of which is connected respectively at one end to one end of the corresponding phase winding, the conductors being mounted on an elastic support and extending from one end of the corresponding phase winding in a first section vertically downward, thence in a second section directed horizontally for different distances, and thence vertically downward in a third section through an elastic support carried by an insulating plate. The third sections of the hollow conductors pass outward through the bottom of the casing and terminate in polygon-shaped connection terminals. The casing also includes current transformers located below the insulating plate between the depending third sections of the hollow conductors. A somewhat similar arrangement of liquid-cooled hollow conductors is provided within the casing to establish the star-point terminal connection for the three phases of the stator winding.

SUMMARY OF THE INVENTION

The objective of the present invention is to improve the construction disclosed in the prior filed patent application as mentioned above, in that there will be no need for assembling separate individual structural components at the power plant where the turbo-generator is to be installed but rather it will be possible to complete the assembly of large-sized modules at the place of manufacture, and that these modules can be interconnected at the power plant site in a simple manner.

The problem is solved in that the necessary covering shield for the lead-off conductors is broken down into an individual shield component for each such conductor, the shield being in the form of a box-like structure made from an electrically conductive but non-magnetic metallic material and which surrounds the above-mentioned "third" section of each of the conductors. The boxes are placed in side-by-side relation and bolted together and they depend from a pair of parallel spaced vertically arranged plates which are secured to the underside of a metallic plate which, in turn, is suspended from the underside of the turbo-generator housing by means of a series of longitudinally spaced elastic supports. Also, the interfacing side walls of the boxes are open to provide communication therebetween and these openings include arc barriers. Should a short-circuit to ground occur in one generator lead-off conductor, these arc barriers will prevent a multi-phase short-circuit, thus holding any damage to a minimum.

Each of the boxes is open at the bottom through which the lead-off conductor passes, the conductor being supported in the bottom portion of the box at the center of a star-shaped arrangement of three insulators. The latter is well suited for absorption of any surge of short-circuit forces so that the lead-off conductors will have sufficient resistivity to sustain short-circuits without detrimental effects. One component of the forces will also be compensated out by the currents flowing in the shielding boxes.

After leaving the shielding boxes, the lead-off conductors are connected to the corresponding phase lines by means of terminal structure, and each of these phase lines is surrounded by tubular metallic shielding which is connected to the bottom of the box by means of a metallic bellows.

The improved structural arrangement for shielding the lead-off conductors makes possible a significant reduction in the time required for assembly of the turbo-generator. Furthermore, the cost of the shielding structure for the lead-off conductors is substantially lower in comparison with that of the shielding arrangement as disclosed in our afore-mentioned patent application because the shielding can be made from a metal, e.g., aluminum sheet. The fundament is shielded from the magnetic field by this sheet.

The shielding boxes can also be constructed in multi-part form which has the advantage that the boxes can be dis-assembled for purposes of repair without the need for removing the lead-off conductor.

A further feature of the present invention is that the tubing for supplying the fluid coolant to the star-point connecting terminal structure for the three-phase winding of the stator passes from above through the associated current transformer and that the tubing for returning the fluid coolant likewises emerges at the top. If it should become necessary to remove one of the current transformers at the star-point, it will not then become necessary to dis-assemble the tubing supplying the fluid coolant, thus eliminating the need to drain off the coolant.

BRIEF DESCRIPTION OF THE DRAWINGS

The foregoing as well as other objects and advantages inherent in the invention will become more apparent from the following detailed description of a preferred embodiment thereof and from the accompanying drawings wherein.

DETAILED DESCRIPTION OF THE PREFERRED EMBODIMENT

Figure 2:
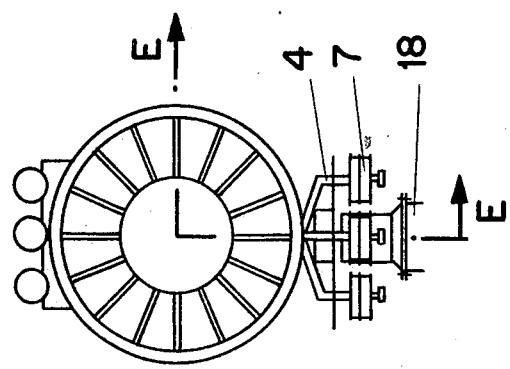
FIG. 2 is a view from the front of the structure depicted in FIG. 1.
Figure 1:
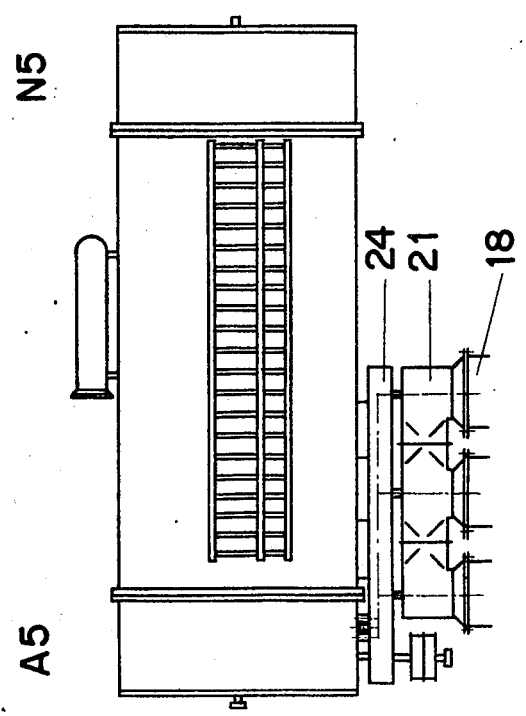
FIG. 1 is a side view of a turbo-generator with a stator power terminal assembly in accordance with the invention.

With reference now to the drawings, a main housing structure 1 for a turbo-generator includes individual shielding 2.1 for three fluid-cooled phase lead-off hollow conductors 5 in the form of separate metallic boxes placed side-by-side and secured together, with the bottom openings 3 of these shielding boxes and lead-off conductors 4 from ends of the three phase windings being interconnected by hollow conductors 4.1 to form a star-point of the three-phase winding.

Figure 4:
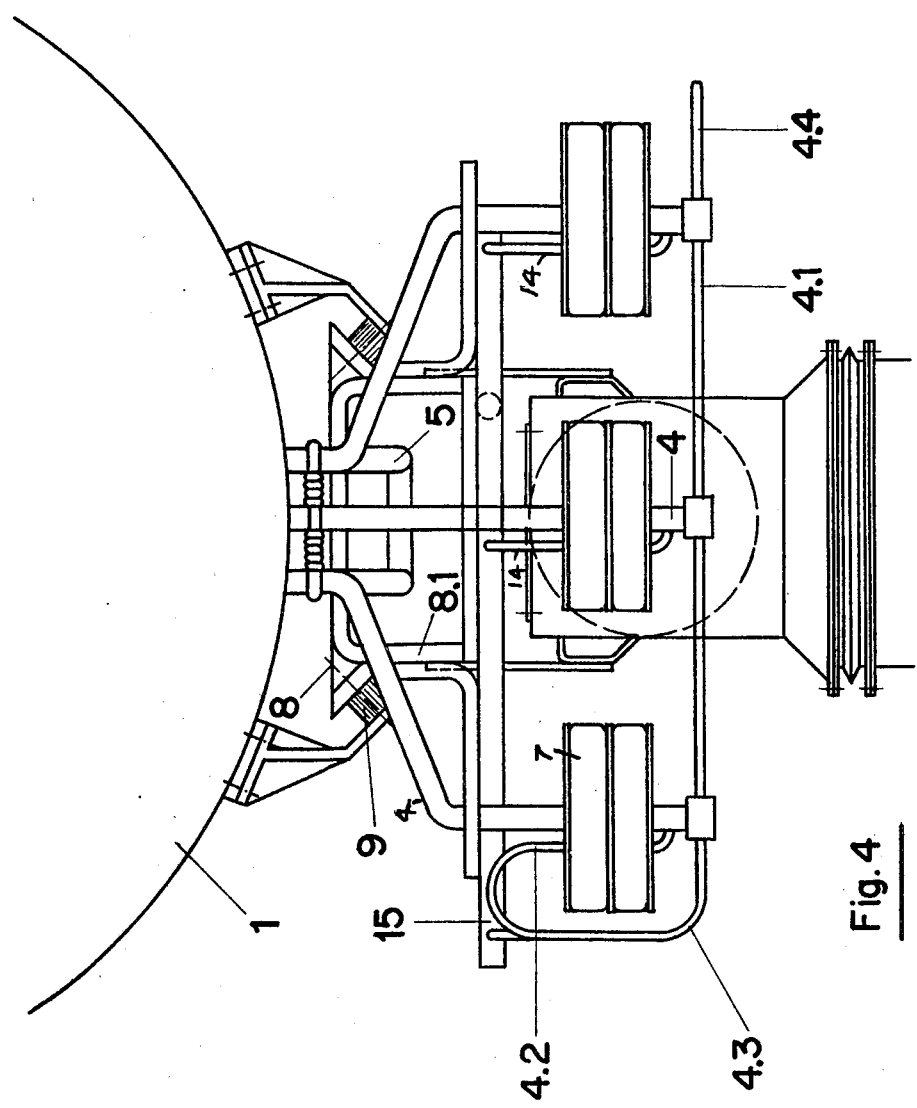
FIG. 4 is a view taken along line F—F in FIG. 3 showing the arrangement of the lead-off conductors which interconnect to form the star-point.

The hollow conductors 4.1 which connect to form the star-point extend in a horizontal direction transversely of the turbo-generator axis. The middle one of the three hollow lead-off conductors 4, as seen in FIG. 4 extends vertically downward from the head of the stator winding to the star-point interconnection hollow conductors 4.1 while the other two lead-off hollow conductors 4 located on opposite sides of the middle lead-off conductor are each twice bent in order to maintain a horizontal spacing that is necessary to accommodate three current transformers 7 which respectively surround the lead-off conductors 4 and are horizontally aligned in a direction transverse to the longitudinal axis of the turbo-generator.

Figure 3:
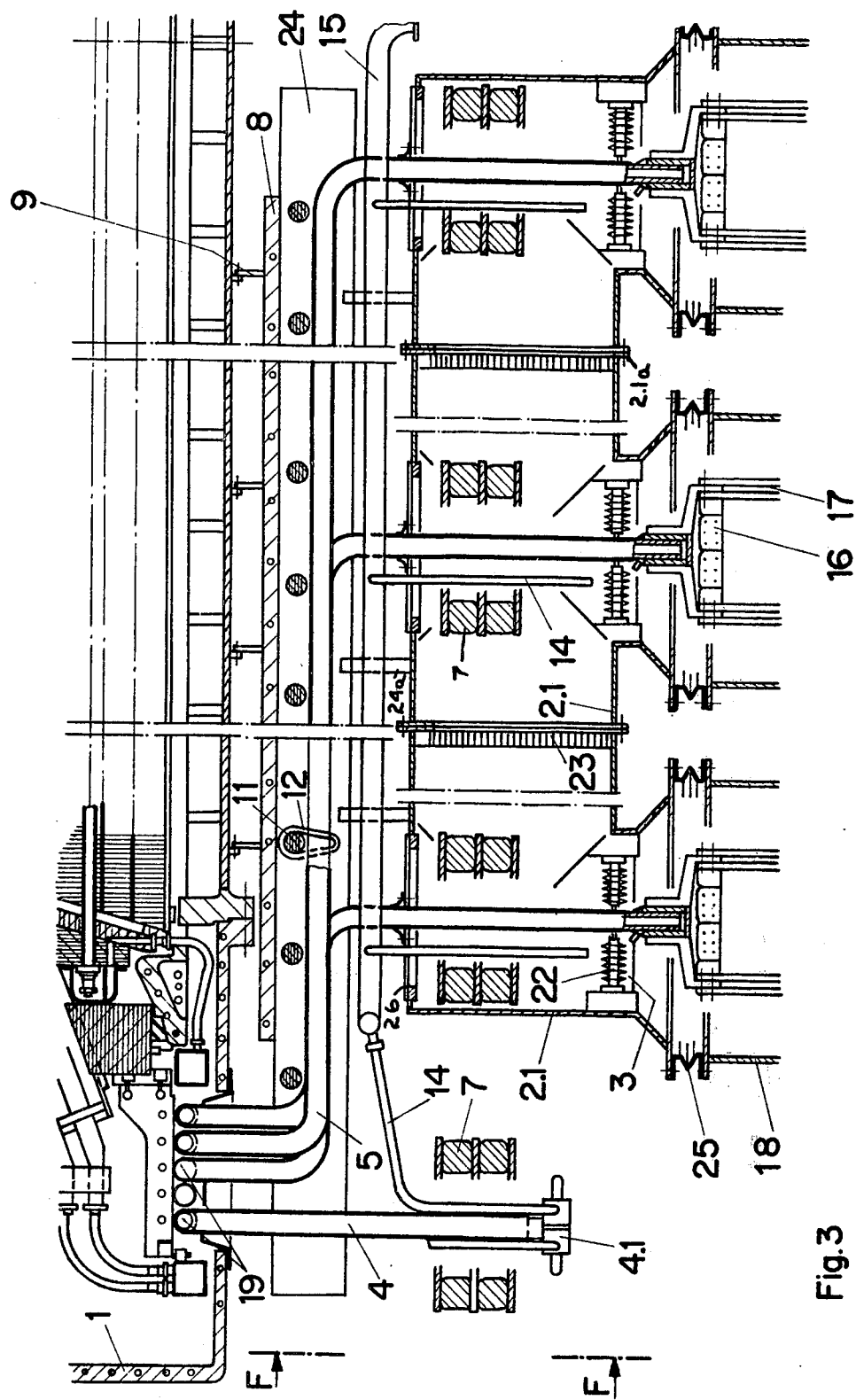
FIG. 3 is a longitudinal cross-section taken along line E—E of FIG. 2 depicting the stator winding lead-off conductors for the three phases and their respectively associated shielding.

The three hollow fluid-cooled phase lead-off conductors 5 as shown in FIG. 3, all of which are electrically insulated throughout their entire length for the full machine voltage, extend respectively from one end of the corresponding phase winding in the stator in a first section vertically downward, thence in a second section directed horizontally for different distances and thence vertically downward in a third section, each of the latter being surrounded and shielded individually by means of a metallic box 2.1.

The horizontally extending or "second" portions of the insulated lead-off conductors 5 are located between and secured by means of a series of horizontally spaced bolts 11 and straps 12 to a pair of parallel spaced plates 24 which are secured to the underside of a metallic plate 8 which, in turn, is suspended from the underside of the turbo-generator housing 1 by means of a series of longitudinally spaced elastic supports 9.

The three boxes 2.1 which shield the lower vertically extending portions of the three lead-off conductors 5 are, in turn, hold connected to and depend from the plates 24 by means of elongated plate members 24a. The boxes 2.1 which are made from a good electrically conductive but non-magnetic material such as aluminum enclose current transformers 7 and are open at the bottom, and vertically extending or "third" these lead-off conductor portions are each supported within a corresponding box by means of an upper pass-through plate-like insulator plate 26 and a lower star-like arrangement of insulators 22. The bottom opening 3 of each box widens in the downward direction into a funnel which terminates in a flange to which a bellows 25 is attached, and depending from each of these bellows is a shielding tube 18. The funnel-shaped opening 3, bellows 25 and shielding tube 18 surround a polygon-shaped terminal 16 electrically connected to the lower end of each lead-off conductor 5 and to which the phase line 17 is attached. The shielding tubes 18 are connected with each other galvanically and therefore possess an electrically identical potential. The electrical bridging-over between the lower parts 3 of boxes 2.1 and the shielding tubes 18 provided by the bellows 25 also ensure that these tubes 18 will be at the same potential as the boxes 2.1. The boxes include flanges 2.1a located at the interface formed between the side walls of adjacent boxes and by means of which adjacent boxes are bolted together, as indicated schematically. The interfacing side walls of the boxes are provided with openings at which arc barriers 23 are located which function to prevent a multi-phase short circuit in the event of a short-circuit to ground by one of the lead-off phase conductors 5. A multi-phase short circuit would obviously result in greater damage than a short circuit of one of the phases.

Cooling of the connecting phase lines 17 is accomplished by a flow of cooling air which flows through the two outer shielding tubes 18 from the bottom upward, thence through the two outer boxes 2.1 and into the middle box by way of the arc barriers 23, and thence downwardly through the middle box and outwardly through the middle shielding tube.

As more fully shown in Applicants' previously referred to co-pending application Ser. No. 588,624, now U.S. Pat. No. 4,029,978, each of the lower ends of the lead-off conductors 5 terminates within a hollow cylinder of large diameter which is closed off at its bottom and connected electrically and liquid-tight to the lead-off conductor which is provided with an opening through the wall which is connected to the lower end of tube 14 whose other end is connected to the return or collecting main 15 for the fluid coolant extending longitudinally of and below the machine housing 1. In this manner, fluid coolant flows to the collecting main 15 after being passed through the hollow lead-off conductors 5.

The three hollow phase lead-off conductors 4 from the stator winding which form the electrical star-point connection terminate in the same type of structure as is used for the lead-off conductors 5 and include tube connections leading from the interior of the conductors 4 back to the fluid coolant collecting main 15. The lead-back tube connections 14 associated with the center conductor 4 and the one to the right thereof as viewed in FIG. 4 extend through the central opening within the current transformers 7 which surround these conductors.

Two tubular star-point connectors 4.1 placed side-by-side interconnect the three conductors 14 and are connected in series for the purpose of establishing a flow path for the coolant discharged from the hollow lead-off conductor 4 at the left, as viewed in FIG. 4 and which flows through a tube 4.2 into one of the two star-point connecting tubes 4.1, thence by way of a U-shaped connecting tube 4.4 into the other connecting tube 4.1 and returns through this tube and by way of tube 4.3 to the coolant collecting main 15.

A removal of one of the three current transformers 7 associated respectively with the star-point forming hollow conductors 4 does not require dis-assembly of the tubes supplying and returning the fluid coolant since the construction permits one to swing the connecting tubes 4.1 downward after sealing them off from the lead-off conductors 4. There is therefore no need to drain the tubes carrying the fluid coolant.

We claim:

1. The combination with a high-output three-phase turbo-generator the housing of which is filled with a non-combustible and non-oxidizing gas at a pressure level exceeding atmospheric and wherein the rotor conductors and the stator conductors are cooled by circulation of a liquid coolant, of a stator conductor terminal assembly for electrically leading out the phase windings from the coil heads, said conductor terminal assembly comprising a metallic plate extending longitudinally of and below said turbo-generator housing, elastic supports securing said metallic plate to the underside of said turbo-generator housing, a pair of parallel spaced vertically arranged plates secured to the underside of said metallic plate, three tubular lead-off conductors insulated throughout their entire length against the full voltage of said stator windings, said lead-off conductors being connected respectively at one end to one end of the corresponding phase winding and which extend from the latter in a first section directed vertically downward, thence in a second section directed horizontally for different distances through the space between said pair of vertically arranged plates and thence in a third section directed vertically downward, individual shielding for the third section of each of said lead-off conductors in the form of a metallic box-like enclosure and through which said third section extends, a star-like arrangement of insulators in each box-like enclosure supporting said third section, a current transformer surrounding said third section within said box-like enclosure, the lower end of said third section extending outwardly through the bottom open end of said box-like enclosure and being connected to a terminal which is in turn connected to an outgoing phase line, and a tubular metallic shielding surrounding each of said phase lines.

2. A stator conductor terminal assembly for a three-phase turbo-generator as defined in claim 1 where said box-like enclosures for said third section of each of said lead-off conductors are constructed from a plurality of interconnected components.

3. A stator conductor terminal assembly for a three-phase turbo-generator as defined in claim 1 wherein said box-like enclosures for said third section of each of said lead-off conductors are made from a metallic material which has a good electrical conductivity characteristic but is non-magnetic.

4. A stator conductor terminal assembly for a three-phase turbo-generator as defined in claim 3 wherein said box-like enclosures for said lead-off conductors are made from aluminum.

5. A stator conductor terminal assembly for a three-phase turbo-generator as defined in claim 1 wherein the three box-like enclosures for said lead-off conductors are mounted in side-by-side relation and include flange means by which they are bolted together.

6. A stator conductor terminal assembly for a three-phase turbo-generator as defined in claim 5 wherein the interfacing side walls of said box-like enclosures are provided with openings in which arc barriers are located.

7. A stator conductor terminal assembly for a three-phase turbo-generator as defined in claim 1 and which further includes three additional tubular lead-off conductors connected respectively to the other ends of the phase windings and extending downwardly in spaced relation and aligned in a direction transverse to said turbo-generator housing, a current transformer surrounding each of said additional lead-off conductors, an electrically conductive tubing interconnecting all of additional lead-off conductors to establish the star-point terminal of said stator winding, means including a fluid coolant supply tube connected to the lower end of one of said lead-off conductors and which extends upwardly through the opening in said current transformer for supplying a fluid coolant to said tubing and an electrically conductive bellows connecting said tubular metallic shielding to the bottom end of said box-like enclosure.

* * * * *